United States Patent [19]

Schmidt

[11] Patent Number: 4,964,773

[45] Date of Patent: Oct. 23, 1990

[54] ANTI-THEFT APPARATUS INCLUDING A SCREW WITH AN ANTI-THEFT SAFETY HEAD

[76] Inventor: Reinhold Schmidt, Talhauser Strasse 62, Ebringen, Fed. Rep. of Germany

[21] Appl. No.: 410,703

[22] Filed: Sep. 21, 1989

[30] Foreign Application Priority Data

Sep. 23, 1988 [DE] Fed. Rep. of Germany ....... 3832359

[51] Int. Cl.⁵ ....................... F16B 19/00; F16B 33/00; F16B 43/00

[52] U.S. Cl. .................................... 411/373; 411/396; 411/910; 70/232

[58] Field of Search ................................ 411/371-373, 411/429, 430, 431, 374, 396, 910, 354, 349, 549; 403/323, 348; 292/153; 70/232

[56] References Cited

U.S. PATENT DOCUMENTS

| | | | |
|---|---|---|---|
| 1,812,467 | 6/1931 | Blackmore | 70/232 |
| 1,877,545 | 9/1932 | Wise | 70/232 |
| 1,912,872 | 6/1933 | Trautner | 70/232 |
| 2,340,864 | 2/1944 | Carpenter | 411/910 |
| 3,174,383 | 3/1965 | Heil | 411/910 |
| 3,757,550 | 9/1973 | Kayser | 70/232 |
| 4,288,902 | 9/1981 | Franz | 411/349 |
| 4,574,602 | 3/1986 | Furuse | 411/910 |

FOREIGN PATENT DOCUMENTS 2095356 9/1982 United Kingdom .

*Primary Examiner*—Neill R. Wilson
*Attorney, Agent, or Firm*—Flynn, Thiel, Boutell & Tanis

[57] ABSTRACT

A screw with an anti-theft safety head is suggested, which safety head is provided with a bore receiving a substantially cylindrically constructed tool extension part originating at the screw. At least two rotatably supported pins are arranged substantially parallel next to the bore in the anti-theft safety head, which pins are each rotationally fixed to a locking member. The locking members can be swung into an annular groove on the tool extension part by rotating the associated pin from its upper end, which upper end is accessible from outside and is constructed as an adjusting tool adapter segment. Only when all pins and locking members assume a very precisely defined position, it is possible to pull off the anti-theft safety head. The solid construction of the anti-theft safety head provides a novel anti-theft protection of the screw.

24 Claims, 4 Drawing Sheets

FIG. 1
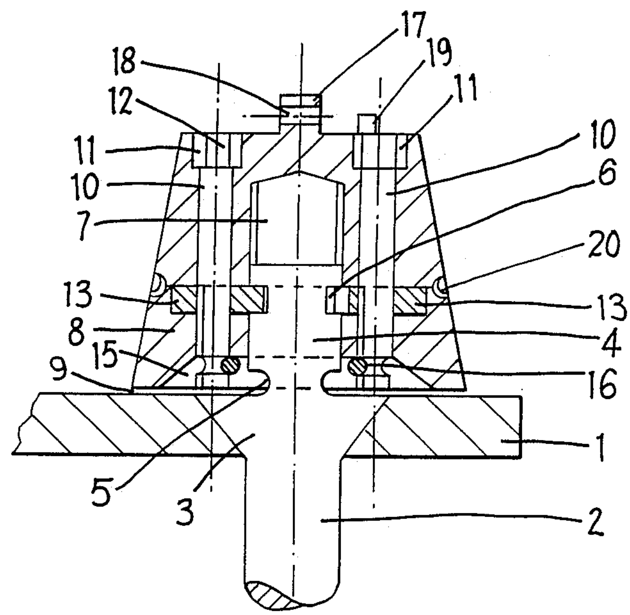
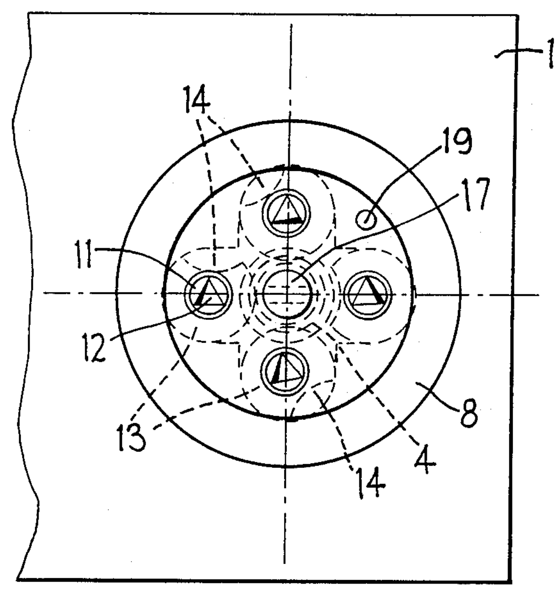
FIG. 2

25
21
26
23
22

12
24
28
29
27
29
12

25
21
22

8
30
2
1

ANTI-THEFT APPARATUS INCLUDING A SCREW WITH AN ANTI-THEFT SAFETY HEAD

FIELD OF THE INVENTION

The invention relates to a screw with an anti-theft safety head, which safety head is provided with a bore receiving a substantially cylindrically constructed tool extension part originating at the screw.

BACKGROUND OF THE INVENTION

Such a screw is known from German OS 31 48 565, in which a rotatably supported anti-theft safety head surrounding the screw head prevents the screw from being rotated by means of pliers or the like. The screw arranged in the anti-theft safety head and accessible from above is constructed as a tool extension part and has suitable recesses to receive pegs of a special tool. The disadvantage of the known arrangement lies in the special tool, for releasing the screw, being able to be very easily copied, so that the article to be locked up, for example a tire rim, an art object, a safe or the like, is not sufficiently protected. Moreover, the thin-walled anti-theft safety head can be removed relatively easily with force, so that the screw can be loosened or unscrewed by means of pliers or the like.

The basic purpose of the invention is to provide a screw with an anti-theft safety head of the above-mentioned type, which can be released with a relatively simply designed tool, but nevertheless is protected against theft, such that a loosening of the screw cannot occur even when force is applied.

SUMMARY OF THE INVENTION

This purpose is attained according to the invention by arranging at least two rotatably supported pins substantially parallel next to a bore in the anti-theft safety head, which pins are each rotationally fixed to a locking member, which locking member can be swung into an annular groove on the tool extension part by rotating the associated pin, the upper end region of each pin, which upper end is accessible from the exterior, being constructed as an adjusting tool adapter segment.

The anti-theft safety head can through this arrangement be constructed as a strong solid part in which, in addition to the bore for the tool extension part, only bores for the pins and notches suitably shaped for the locking members must be provided. Through this an extensive protection against mechanical damages is achieved. To release the anti-theft safety head, a very specific positioning of the pins relative to the adjusting tool extension part must be achieved, so that the locking members disengage from the annular groove. The anti-theft safety head can be pulled off only in this position and the screw can be loosened through the tool extension part. Since almost any desired combination for the position of the pins exists, finding the unlocking position is almost impossible. The anti-theft safety head is, regardless of the position of the pins or locking members, rotatably arranged on the tool extension part, so that a torque transmission onto the screw by any tool is impossible.

The construction of the bore as a blind hole and in particular as a fitting hole is especially advantageous, since it prevents any access to the tool extension part and increases the stability of the anti-theft safety head. The fitting hole prevents a lateral swinging of the anti-theft safety head on the tool extension part, so that a gripping under the safety head with a tool can be prevented. The tool extension part originating at the screw is constructed either as a screw head itself or preferably as an extension of the screw head. If one constructs the connecting point between the tool extension part and the screw head as a breaking point, then the tool extension part breaks off if a threshold lateral force is applied, and the screw head can no longer be released, in particular when it is constructed with a countersunk head flush with the fastening plane.

If the screw head, which is, for example, constructed as a fillister, cylinder or semicircular head, projects over the fastening plane, then the anti-theft safety head is provided with a corresponding recess receiving the projecting area of the head.

The locking members are advantageously constructed as disks received in corresponding recesses in the anti-theft safety head, which disks each have a recess on their peripheral edge, with the unlocking position existing only when the recesses point radially toward the axis of rotation of the anti-theft safety head. In particular, when the recesses have a radius which corresponds substantially with the one of the tool extension part, it is possible to release the anti-theft safety head only at a very exact angle adjustment of all pins. When the correct angle coding is not known, an unauthorized removal of the anti-theft safety head is virtually impossible.

Through openings for the pins are advantageously provided in the locking members, with the pins being adapted in cross section to the through openings and having a cross section deviating from the circular shape and being constructed in particular as a regular polygon. Thus the pins can be inserted in various ways into the locking members, and additional individual coding possibilities result.

The pins are provided advantageously with a continuously acting brake, which is constructed preferably as a spring ring resting on all pins and which extends radially outwardly into annular grooves formed in the pins. Thus, one single spring ring can act as the brake for all pins, so that the pins are safely secured in their respective position.

The adjusting tool adapter segment on the pins is constructed preferably as a head countersunk in the anti-theft safety head, so that a forced access is prevented. This head is provided with an adjusting polyhedral opening for engagement by an adjusting tool. The adjusting polyhedral opening is constructed preferably not rotationally symmetrical, so that only one single possibility for engagement by the adjusting tool exists. The adjusting tool itself can, for example, have a marking which can be moved into alignment with a corresponding marking on the anti-theft safety head. Thus, the adjusting tool itself contains the coding.

However, it is also possible that the head has coding markings for the adjusting tool adapter segments or rather the adjusting tool has in particular coding scales, or that a coding disk carrying corresponding markings is provided. Thus, a coding value can be determined as a number value by reading on the respective coding scales the respective position of the marking of the coding tool. The coding tool itself and the coding disk can, as part of the coding, also have coding numbers, which are added to the ones of the reading value. A yet greater plurality of codings can be achieved in this manner by variation of the coding tool and of the coding disk.

A pulling-off peg is advantageously provided on the side of the anti-theft safety head opposite the screw, which pulling-off peg permits, for example through the engagement of a hook therewith, a pulling off of the anti-theft safety head after adjustment of the coding. The pulling-off peg can serve simultaneously as a centering device for the coding disk, which at a cylindrical construction of the pulling-off peg requires further an additional adjusting device for the angle-correct adjustment.

In particular with the anti-theft safety head being constructed as a circular, truncated cone-shaped, hardened steel part, forced access to the screw is effectively prevented. To protect against a forceful action, it is also possible to countersink the anti-theft safety head, or to surround it by a protecting tube fixedly connected, in particular welded, to the fastening plane.

BRIEF DESCRIPTION OF THE DRAWINGS

One exemplary embodiment of the invention is explained in greater detail in the following description with reference to the drawings, in which:

FIG. 1 is a cross-sectional side view of the screw with an anti-theft safety head in a mounted and locked state;

FIG. 2 is a top view of the arrangement illustrated in FIG. 1;

DETAILED DESCRIPTION

Figure 3:
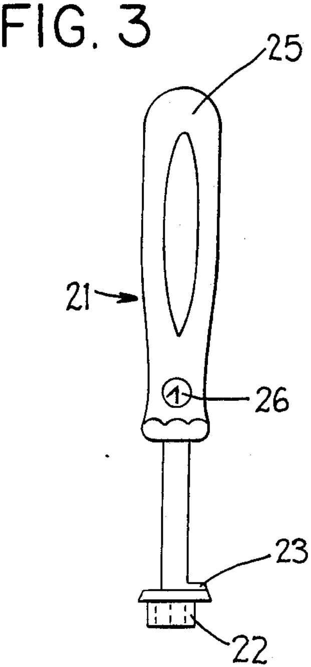
FIG. 3 is a side view of a coding tool.

According to FIGS. 1 and 2, a countersunk screw 2 is inserted into a plate 1, which plate is to be locked in position. The screw 2 has a cylindrical tool extension part 4. A reduced diameter portion 5 is arranged as a breaking point between the tool extension part 4 and the flat upper side of a countersunk head 3 of the screw 2. The tool extension part 4 has an annular groove 6 located axially centrally on its periphery, which annular groove 6 could, for example, also be arranged axially lower on the extension part 4. The axially upper area 7 of the tool extension part 4 is adapted for the attachment of a tool to tighten and loosen the countersunk screw 2. The illustration shows, that this upper area 7 has a cross-sectional surface constructed as a polyhedral surface, in particular a hexagonal surface. However, this upper area 7 can principally also have a bore for engagement by a polyhedral key. The polyhedral surface can also have an irregular design, so that a special tool is needed, which contributes to enhanced safety.

An anti-theft safety head 8 mountable onto the tool extension part 4 consists, of hardened steel or another hard or resistive material and has a blind hole which is suitably dimensioned to receive the tool extension part 4, with as little clearance as possible provided therebetween. The anti-theft safety head 8 has a circular, truncated cone-shaped design, and can therefore be freely rotated on the tool extension part 4. The blind hole in the safety head 8 is dimensioned axially to provide an as small as possible gap 9 between the lower surface of the anti-theft safety head 8 and the upper surface of the countersunk head 3 in order to prevent insertion of a lever-like tool, as for example a screw driver, to lift off the anti-theft safety head 8. Evenly circumferentially distributed, axially extending, through bores are provided in the safety head 8 at an equal distance from and parallel to its axis of rotation. The through bores are provided to receive four pins 10. The pins 10 each have on top a head-like end constructed as an adjusting-tool adapter segment 11. The segment 11 is countersunk in the anti-theft safety head 8 in order to prevent forced access to the pins 10. The adjusting tool adapter segments 11 have at the upper end an opening 12 for engagement by a coding tool. The openings 12 have a triangular cross section in the illustrated exemplary embodiment. The adjusting by means of a coding tool will be described below.

Furthermore, the lower end portions of the otherwise cylindrical pins 10 have, for example, a hexagonal or gearlike cross section, and, in mounted condition, received in correspondingly shaped openings in locking disks 13, thus creating a rotationally fixed connection. The locking disks 13 are rotatably supported in correspondingly shaped flat recesses or notches in the anti-theft safety head 8. The substantially cylindrical locking disks 13 have each a round concave notch 14 at one point of their periphery. The radius of the notch 14 corresponds with the radius of the tool extension part 4. The locking disks 13 extend into the annular groove 6 of the tool extension part 4 and thus lock the anti-theft safety head 8 to the tool extension part 4. Only in a position, in which all circular notches 14 point radially inwardly so as to be aligned with the outer periphery of the extension part 4, is it possible for the locking disks 13 to disengage from the tool extension part 4, so that the anti-theft safety head 8 can be pulled off from the part 4. Even a very slight rotation of only one single pin 10 such that the notch 14 associated therewith is no longer properly aligned with the part 4 results again in locking of the part 4 to the head 8. Thus, only in one single, very precisely adjusted position of all pins 10 is it possible to remove the anti-theft safety head 8.

Figure 7:
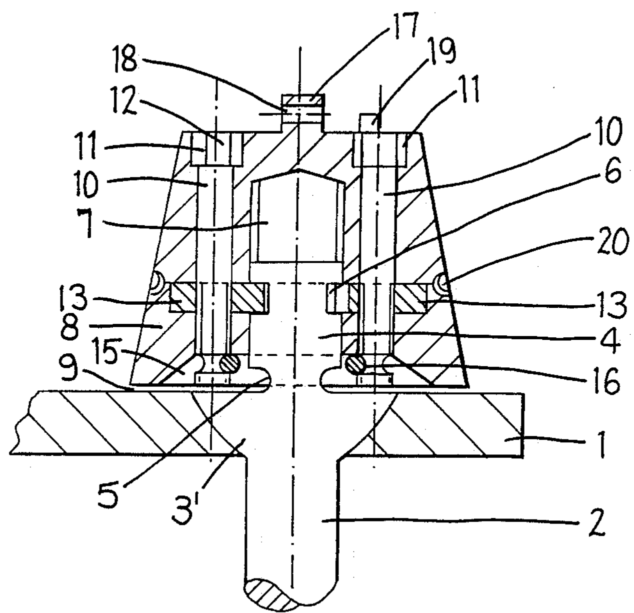
FIGS. 7–9 illustrate alternative embodiments of the arrangement of FIG. 1.

The lower ends of the pins 10 project into a recess 15 at the lower end of the anti-theft safety head 8, which recess can, for example, also be constructed such that screws having different heads, as for example fillister 3′ (FIG. 7), cylinder 3″ (FIG. 8) or semicircular 3‴ (FIG. 9) heads, can be used. There is still only a very small gap between the head 8 and the plate 1 radially outside the recess 15. The outer, lower edges of the anti-theft safety head 8 are thereby dimensioned so thick that damage is unlikely. The lower portions of the pins 10 which project into the recess 15 have peripheral annular grooves formed therein and into which annular grooves extends, from radially inside the pins, a spring ring 16 resiliently urging the pins 10 radially outwardly in order to stabilize their position like a brake. The spring ring 16 simultaneously serves as a lock preventing a pulling out of the pins 10 from above.

A pulling-off peg 17 is arranged centrally on the upper side of the anti-theft safety head 8, which peg 17 has a cross bore 18 to receive a pulling-off tool, for example a hook. The anti-theft safety head 8 can be pulled off with such hook after the appropriate adjusting has taken place even if the head 8 is countersunk or hardly accessible. The pulling-off peg 17 is simultaneously used for centering a coding disk, as will be described below. A further peg 19 is used to adjust the coding disk, also described below.

In place of the illustrated locking disks 13 it is, of course, also possible to provide locking members having a different design. It is thereby not important that their outer circumference is circular, but simply irregular, so that they disengage in at least one angle position from the tool extension part 4. Furthermore it is also possible to provide a fixed connection between the pins 10 and the locking disks 13. Finally, the number of the pins is not limited to the illustrated arrangement, although at least two pins must be provided in order to achieve the desired safety. A higher number of pins 10 is only limited by the available space.

Figure 8:
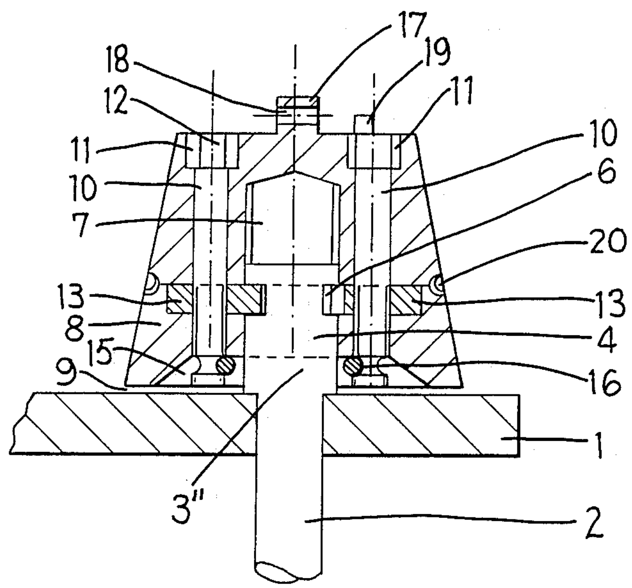
Figure 9:
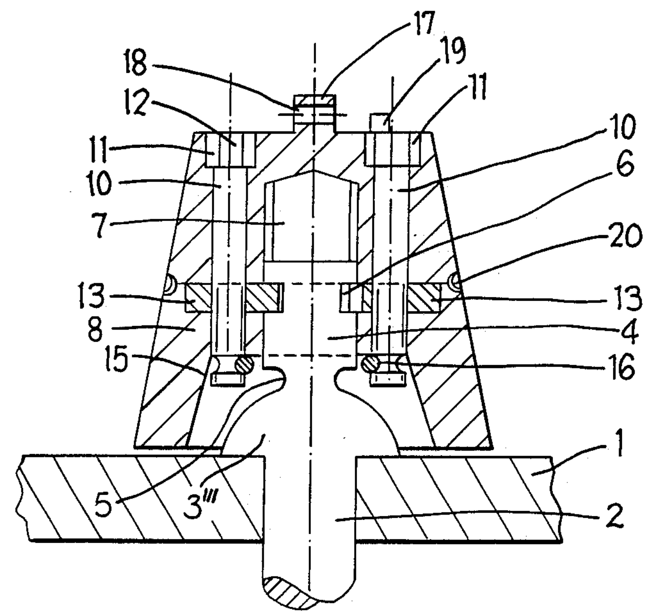

As illustrated in FIG. 8, it is also possible in a simpler embodiment to cylindrically extend the entire screw head 3 and to construct it correspondingly as a tool extension part 4 instead of providing a tool extension part formed on the screw head.

The anti-theft safety head 8 can be manufactured, for example, by first creating the blind hole and the through bores. The anti-theft safety head 8 is thereafter separated approximately in the center in a plane perpendicular with respect to the axis of rotation, so that corresponding circular-cylindrical notches for the locking disks 13 can be created. The two parts are subsequently again assembled and welded together by means of a welding seam 20. Same can thereafter be milled or ground. However, it is principally also possible to manufacture the anti-theft safety head 8 in one piece. The notches for the locking disks 13 are then formed along with the blind hole, which notches must then be dimensioned correspondingly With respect to the design of the locking disks.

The locking disks 13 are first inserted for the installation followed by the pins 10, which are inserted from above and are finally secured with the spring ring 16. If the cross section of the lower portion of the pins 10 is symmetrical, a different coding can be achieved by differently placing the pins 10 into the locking disks 13. This coding can then, for example, also subsequently still be changed in a simple manner.

Figure 4:
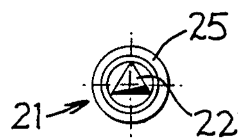
FIG. 4 is a bottom view of the coding tool illustrated in FIG. 3.
Figure 10:
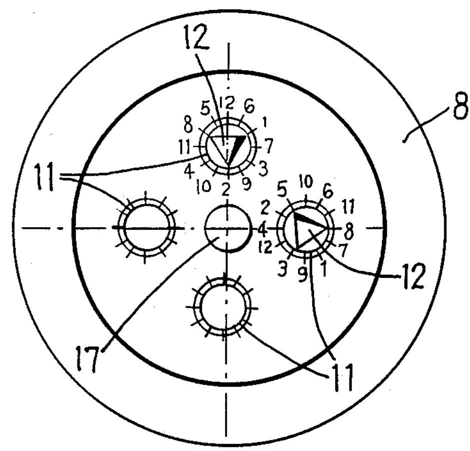
FIG. 10 is a view similar to FIG. 2, but showing a modification of the anti-theft safety head.

The coding tool 21 shown in FIGS. 3 and 4 is used for adjusting the coding. The coding tool 21 is designed like a screw driver. The end used for engagement with and rotation of the adjusting tool adapter segment 11 is constructed accordingly, in the illustrated case as a trihedral 22. It may in this case be either a trihedral with an uneven edge length, so that only one single engaging position exists, or an equilateral trihedral, and a corresponding insert marking is provided. The coding tool 21 has a coding nose 23, which must be radially aligned with corresponding markings on the upper side of the anti-theft safety head 8 (see FIG. 10) or with provided positions of a coding disk 24 illustrated in FIG. 5. The coding tool 21 has thereby numbers, shown at 26 in FIG. 5, marked on its handle 25, which numbers contain the coding of the coding nose 23. Thus, a number of similar coding tools 21 can be manufactured, each being suited to create a different respective coding or decoding.

Figure 5:
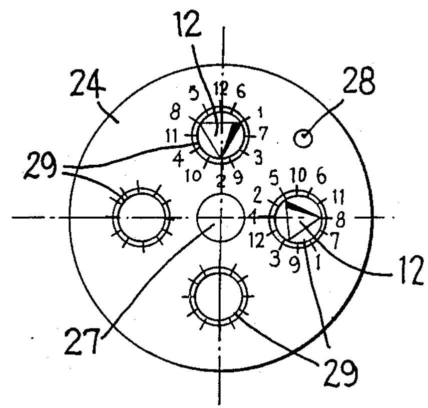
FIG. 5 is a top view of a coding disk showing its cooperation with adjusting tool adapter segments of the safety head of FIG. 1.

Using the coding disk 24 illustrated in FIG. 5, same is first placed onto the anti-theft safety head 8 by means of the holes 27 and 28 with the pulling-off peg 17 and the peg 19 extending into the holes 27, 28. All locking disks 13 are now moved into the unlocked position by rotating the pins 10 (along with the locking disks 13 rotatably connected thereto) appropriately, and the coding tool 21 now determines the coding by being consecutively inserted into all openings 12 of the adjusting tool adapter segment 11. The four codings are then determined by means of the coding nose 23 using the numbers on the coding disk 24, so that a four-digit number results as coding. If one adds the coding number of the coding tool 21 itself and possibly the number coding on the back of the coding disk 24, then a six-digit coding number results. After adjusting the pins 10, a particular coding tool 21 and a particular coding disk 24 are then required in order to unlock the anti-theft safety head 8. In the case of the four illustrated through openings 29 in the coding disk 24, only two are shown provided with complete scale markings.

Figure 6:
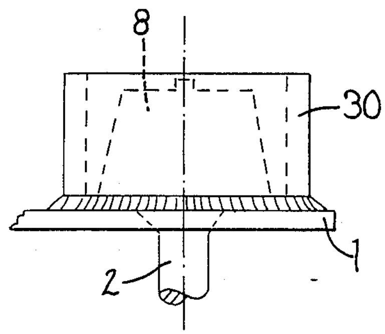
FIG. 6 is a side view of the anti-theft safety head of FIG. 1 arranged in a protecting tube.

The anti-theft safety head 8 is preferably countersunk. Where this is not possible, a protecting tube 30 according to FIG. 6 can also be welded around the place of installation of the anti-theft safety head 8 on the plate 1 or other article to be secured in order to make a forced access to the anti-theft safety head 8 more difficult.

Of course, it is possible to manufacture the anti-theft safety head 8 very variably with respect to design and size, depending on the screw size and/or the particular application. It is also possible to use the same anti-theft safety head 8 for different screws 2, if the screws are provided with the same tool extension parts 4. These can be screws with a left-hand or a right-hand thread.

Since the anti-theft safety head should be arranged as close as possible to the plate 1 with the smallest possible gap therebetween, it is necessary that, mainly in the case of countersunk screws, the sinking is done as precisely as possible. Particularly suited for this is therefore a counter-boring tool with a stop for defining the countersinking depth.

As an additional lock it is possible to provide an electric or electronic lock, such that when the protecting tube 30 is dislodged, the anti-theft safety head 8 or the tool extension part 4 triggers an electric contact which activates an alarm.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An anti-theft apparatus, comprising: an anti-theft safety head for use with a threaded fastener, said safety head having a bore which removably receives a substantially cylindrically constructed tool extension part extending from the fastener, and at least two rotatably supported pins arranged substantially parallel next to the bore in the anti-theft safety head, said pins each being connected rotationally fixed to a respective locking member, each said locking member being movable into an annular groove on the tool extension part by rotating the associated said pin and each being movable to a predetermined angular position in which same is free of engagement with said groove, an upper end area of each of the pins, which upper end area is accessible from outside said safety head, being constructed as an adjusting tool adapter segment.

2. The anti-theft apparatus according to claim 1, wherein the bore is constructed as a blind hole.

3. The anti-theft apparatus according to claim 1, wherein the bore is constructed as a fitting hole.

4. The anti-theft apparatus according to claim 1, wherein the tool extension part is constructed as one of a screw head and an extension of a screw head on the threaded fastener.

5. The anti-theft apparatus according to claim 4, wherein the screw head is a countersunk head.

6. The anti-theft apparatus according to claim 4, wherein the screw head is one of a fillister, cylinder and semicircular head, and wherein the anti-theft safety head is further provided with a recess receiving the area of the screw head projecting over a fastening plane.

7. The anti-theft apparatus according to claim 1, wherein said locking members are constructed as disks supported in corresponding recesses in the anti-theft safety head, which disks each have a recess on a peripheral edge thereof, with an unlocking position existing only when the recesses point radially toward an axis of rotation of the anti-theft safety head.

8. The anti-theft apparatus according to claim 7, wherein the recesses have a radius corresponding substantially to a radius of the tool extension part.

9. The anti-theft apparatus according to claim 1, wherein the pins are provided with a constantly acting brake.

10. The anti-theft apparatus according to claim 1, wherein the adjusting tool adapter segment on the pins is constructed as a head countersunk in the anti-theft safety head.

11. The anti-theft apparatus according to claim 1, wherein the adjusting tool adapter segment is provided with an adjusting polyhedral opening.

12. The anti-theft apparatus according to claim 11, wherein the adjusting polyhedral opening has edges of unequal length.

13. The anti-theft apparatus according to claim 1, wherein said safety head is constructed as a hardened steel part.

14. The anti-theft apparatus according to claim 1, wherein said safety head has a circular, truncated cone-shaped structure.

15. The anti-theft apparatus according to claim 1, wherein said safety head is surrounded by a protecting tube fixedly connected to a fastening plate.

16. The anti-theft apparatus according to claim 1, wherein said locking members and said groove are hidden from view when said extension part is removably received in said safety head, and wherein each said locking member is free of engagement with said groove only when in said predetermined angular position thereof.

17. An anti-theft apparatus, comprising: an anti-theft safety head for use with a threaded fastener, said safety head having a bore which receives a substantially cylindrically constructed tool extension part extending from the fastener, and at least two rotatably supported pins arranged substantially parallel next to the bore in the anti-theft safety head, said pins each being connected rotationally fixed to a respective locking member, each said locking member being insertable into an annular groove on the tool extension part by rotating the associated said pin, an upper end area of the pins, which upper end area is accessible from outside said safety head, being constructed as an adjusting tool adapter segment; wherein the tool extension part is constructed as an extension of the screw head and is connected thereto by a breaking point structure.

18. An anti-theft apparatus, comprising: an anti-theft safety head for use with a threaded fastener, said safety head having a bore which receives a substantially cylindrically constructed tool extension part extending from the fastener, and at least two rotatably supported pins arranged substantially parallel next to the bore in the anti-theft safety head, said pins each being connected rotationally fixed to a respective locking member, each said locking member being insertable into an annular groove on the tool extension part by rotating the associated said pin, an upper end area of the pins, which upper end area is accessible from outside said safety head, being constructed as an adjusting tool adapter segment; wherein through openings for the pins are provided in the locking members, with the pins being adapted to conform with said through openings and having in the through opening area a cross section constructed as a regular polygon.

19. An anti-theft apparatus, comprising: an anti-theft safety head for use with a threaded fastener, said safety head having a bore which receives a substantially cylindrically constructed tool extension part extending from the fastener, and at least two rotatably supported pins arranged substantially parallel next to the bore in the anti-theft safety head, said pins each being connected rotationally fixed to a respective locking member, each said locking member being insertable into an annular groove on the tool extension part by rotating the associated said pin, an upper end area of the pins, which upper end area is accessible from outside said safety head, being constructed as an adjusting tool adapter segment; wherein the pins are provided with a constantly acting brake, and wherein the brake is constructed as a spring ring resting on all of said pins.

20. The anti-theft apparatus according to claim 19, wherein the spring ring extends radially outwardly from inside said pins into annular grooves of the pins.

21. An anti-theft apparatus, comprising: an anti-theft safety head for use with a threaded fastener, said safety head having a bore which receives a substantially cylindrically constructed tool extension part extending from the fastener, and at least two rotatably supported pins arranged substantially parallel next to the bore in the anti-theft safety head, said pins each being connected rotationally fixed to a respective locking member, each said locking member being insertable into an annular groove on the tool extension part by rotating the associated said pin, an upper end area of the pins, which upper end area is accessible from outside said safety head, being constructed as an adjusting tool adapter segment; wherein the adjusting tool adapter segment is provided with an adjusting polyhedral opening; and wherein said safety head has means for defining coding markings in the form of coding scales for the adjusting tool adapter segments.

22. The anti-theft apparatus according to claim 21, wherein said means defining said coding markings includes a coding disk carrying said coding markings, and wherein an adjusting device for adjusting the coding disk is provided on said anti-theft safety head.

23. The anti-theft apparatus according to claim 21, wherein a pulling-off peg is provided on a side of said safety head opposite the fastener.

24. The anti-theft apparatus according to claim 23, wherein the pulling-off peg is constructed as a centering device for the coding disk.

* * * * *